United States Patent
Poulin et al.

(10) Patent No.: US 12,196,403 B2
(45) Date of Patent: *Jan. 14, 2025

(54) SELF-ILLUMINATED POWER CABLE WITH OFFSET ENERGY RECOVERY SYSTEM, AND METHOD OF MANUFACTURING SAME

(71) Applicants: NEXANS, Courbevoie (FR); SOCOMEC, Benfeld (FR)

(72) Inventors: Nicolas Poulin, Auchy-les-Mines (FR); Thierry Save, Coulanges les Nevers (FR)

(73) Assignees: NEXANS, Courbevoie (FR); SOCOMEC, Benfeld (FR)

( * ) Notice: Subject to any disclaimer, the term of this patent is extended or adjusted under 35 U.S.C. 154(b) by 451 days.

This patent is subject to a terminal disclaimer.

(21) Appl. No.: 17/435,999

(22) PCT Filed: Mar. 5, 2020

(86) PCT No.: PCT/FR2020/050456
§ 371 (c)(1),
(2) Date: Sep. 2, 2021

(87) PCT Pub. No.: WO2020/178535
PCT Pub. Date: Sep. 10, 2020

(65) Prior Publication Data
US 2022/0146087 A1    May 12, 2022

(30) Foreign Application Priority Data
Mar. 7, 2019 (FR) ...................... 19 02320

(51) Int. Cl.
*F21V 33/00* (2006.01)
*E21F 17/06* (2006.01)
(Continued)

(52) U.S. Cl.
CPC .............. *F21V 33/00* (2013.01); *E21F 17/06* (2013.01); *F21S 4/26* (2016.01); *F21V 15/00* (2013.01);
(Continued)

(58) Field of Classification Search
CPC ... F21V 33/00; F21V 15/00; F21S 4/26; H02J 50/001; E21F 17/06; H01B 7/18
(Continued)

(56) References Cited

U.S. PATENT DOCUMENTS

2015/0214746 A1    7/2015  Lopez Domez et al.

FOREIGN PATENT DOCUMENTS

| CN | 105575530 | 5/2016 |
|---|---|---|
| DE | 102014010414 | 1/2016 |
| GB | 2499570 | 8/2013 |

OTHER PUBLICATIONS

International Search Report dated Aug. 3, 2020.

*Primary Examiner* — Tremesha W Burns
(74) *Attorney, Agent, or Firm* — Sofer & Haroun, LLP

(57) ABSTRACT

The invention relates to a power cable which comprises a central filler region (13) containing at least one conductor element (10), and additionally comprises at least one strip (16) arranged in said central filler region (13) in the vicinity of the conductor element (10). The cable is equipped with a winding-free energy recovery system (11) which supplies the strip (16) with electric current from the energy available in the conductor (10). The strip (16) has a plurality of elements which generate light from this electric current.

10 Claims, 1 Drawing Sheet

(51) Int. Cl.
  *F21S 4/26*    (2016.01)
  *F21V 15/00*   (2015.01)
  *H01B 7/18*    (2006.01)
  *H02J 50/00*   (2016.01)
  *F21Y 115/10*  (2016.01)
  *H01B 9/00*    (2006.01)

(52) U.S. Cl.
  CPC .............. *H01B 7/18* (2013.01); *H02J 50/001* (2020.01); *F21Y 2115/10* (2016.08); *H01B 9/00* (2013.01)

(58) Field of Classification Search
  USPC ........................................................ 174/68.1
  See application file for complete search history.

SELF-ILLUMINATED POWER CABLE WITH OFFSET ENERGY RECOVERY SYSTEM, AND METHOD OF MANUFACTURING SAME

RELATED APPLICATION

This application is a National Phase of PCT/FR2020/050456 filed on Mar. 5, 2020, which claims the benefit of priority from French Patent Application No. 19 02320, filed on Mar. 7, 2019, the entirety of which are incorporated by reference.

The invention belongs to the field of electric power cables intended to transport energy and/or transmit data.

It is particularly applicable to the field of mining cables.

DESCRIPTION OF RELATED ART

Mining cables are regularly damaged or even destroyed by crushing because wheeled machinery does not see them.

Photoluminescent cables do exist, but the layer of dust and/or dirt that settles on the cables quickly makes them invisible. This type of cable does not therefore solve the problem of lack of visibility.

Cables equipped with reflectors also exist, but they have the same drawback: light is unable to reach the reflectors, because of the deposit of dust and/or dirt on the cable.

Document WO 2014/026300 A8 describes an energy-harvesting system based on the principle of self-induction, which harvests energy from a power cable through which electric current is flowing and which powers a strip of light-emitting diodes with a view to increasing the visibility of a three-phase conductor. The energy harvester consists of a ferromagnetic cable around which a copper winding is wound. Voltage is harvested at the ends of this winding. Such an arrangement has a number of drawbacks: the bulk of the copper winding is generally relatively large, making it incompatible with use in plants where space is restricted. Furthermore, the assembly may not be flexible enough to be wound around conductors of small diameter. Moreover, this arrangement does not allow easy integration into a plant and even less so into an electric cable.

OBJECT AND SUMMARY

The aim of the present invention is to remedy the aforementioned drawbacks of the prior art.

To this end, the present invention provides a power cable comprising a central stuffing region containing at least one conductive element, noteworthy in that it further comprises at least one strip placed in the central stuffing region, in the vicinity of the at least one conductive element, the cable being equipped with a windless energy-harvesting system which supplies the strip with electric current on the basis of the energy available in the at least one conductor, the strip comprising a plurality of light-producing elements that produce light from the aforementioned electric current.

Thus, the volume of stuffing material is reduced and the presence of the strip and of the energy-harvesting system hardly increases the final diameter of the cable at all.

Furthermore, the cable according to the invention can never not be seen due to the fact that it supplies itself with electric current and that it therefore produces, via its elements that produce light from this current, a light bright enough to be seen despite the dust and/or dirt present on the cable. Furthermore, the cable lights up as soon as a low current is present in the power conductor.

Consequently, the probability of damage or destruction of the cable according to the invention is significantly reduced, this resulting in fewer repairs and therefore fewer production stoppages for the users of the cable.

In one particular embodiment, the cable further comprises a transparent protective sheath placed around the at least one conductive element, the at least one strip and the energy-harvesting system.

Throughout the present application, by "transparent" what is meant is an element or material that allows the flux of light to pass with greater or lesser ease and through which objects are clearly visible. More particularly, it is an element or material through which an image may be observed without significant loss of contrast: the interposition of the transparent element or transparent material between an image and an observer thereof does not significantly reduce the quality of the image.

The transparent protective sheath allows the strip, conductive element and energy-harvesting system to be protected from external aggressions, while not decreasing visibility, due to the transparent nature of the protective sheath.

In one particular embodiment, the transparent protective sheath is extruded onto the assembly formed by the at least one conductive element, the at least one strip and the energy-harvesting system.

This allows the protective sheath to be positioned in an optimal manner around this assembly.

The transparent protective sheath is for example made of plastic.

In one particular embodiment, the plurality of light-producing elements comprises at least one light-emitting diode or LED.

An LED is a lighting device that is powerful, economical and that has a long lifespan.

The at least one strip may in turn supply electric current to at least one sensor of at least one parameter relative to the state of the cable.

This allows the state of the cable to be monitored without providing an external power source.

In one particular embodiment, the energy-harvesting system extends helically around the at least one conductive element.

This arrangement is advantageous because it allows a good harvest of energy along the entire length of the conductive element.

In one particular embodiment, the at least one conductive element is a phase of the cable.

The cable according to the present invention is for example a mining cable. As mining environments are often dark, the invention is applicable thereto in a particularly advantageous manner.

With the same aim as that indicated above, the present invention also proposes a process for manufacturing a power cable such as briefly described above, noteworthy in that it comprises a step consisting in extruding the protective sheath onto the assembly formed by the at least one conductive element, the at least one strip and the energy-harvesting system.

The particular features and advantages of the process being similar to those of the cable, they are not repeated here.

BRIEF DESCRIPTION OF THE DRAWINGS

Other aspects and advantages of the invention will become apparent on reading the detailed description below of particular embodiments, which are given by way of wholly non-limiting example, with reference to the appended drawings, in which.

DESCRIPTION OF ONE OR MORE EMBODIMENTS

The cable according to the present invention is an electric power cable intended for example to transport energy and/or transmit data. It is for example a mining cable.

Figure 1:
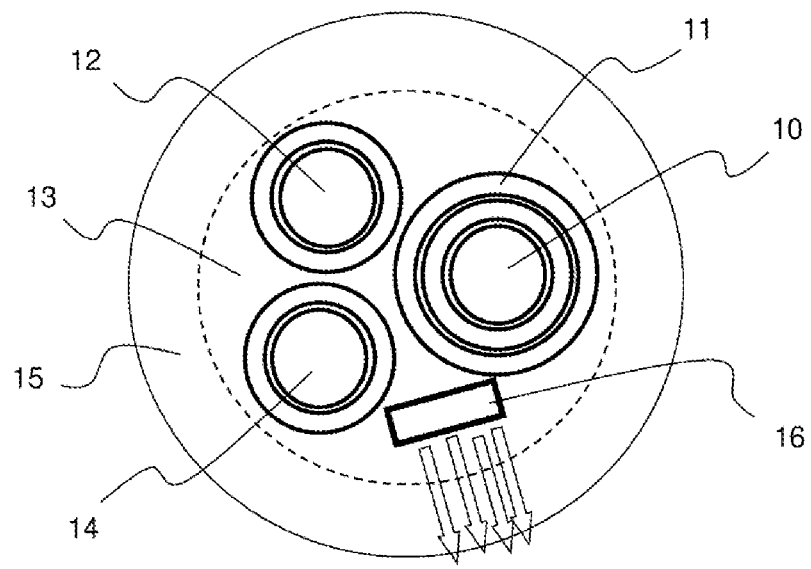
FIG. 1 is a schematic representation of a cross section of a cable according to the present invention, in one particular embodiment.

FIG. 1 shows one particular embodiment of a power cable according to the present invention, seen in cross section.

The cable comprises a central region 13 filled with a stuffing material. The stuffing material is electrically insulating and is for example a plastic. It is encircled by one or more layers 15 of insulating material.

The cable further comprises at least one conductive element contained in the central stuffing region 13. In the particular embodiment illustrated, the cable is three-phase and the central stuffing region 13 therefore comprises three conductive elements 10, 12 and 14. By way of non-limiting example, the conductive element 10 is for example a phase of the cable; the conductive element 12 is for example a neutral element and the conductive element 14 is for example a ground or earth element.

The cable shown in the drawing comprises conductive elements 10, 12 and 14 of circular cross section. Nevertheless, this shape is given by way of nonlimiting example. Other shapes are possible, such as for example a substantially flat cross section.

According to the invention, the cable further comprises at least one strip 16 placed in the central stuffing region 13, between the conductive elements 10, 12 and 14, and therefore in the vicinity of at least one of the conductive elements 10, 12 and 14. In the particular embodiment illustrated, the cable comprises a strip 16 placed in the vicinity of the conductive element 10, which is a phase of the cable.

The width and thickness of the strip 16 depend on the size of the cable and on the application in question. They are chosen so as to allow the cable to preserve an acceptable flexibility and size in this application.

The strip 16 is supplied with electric current on the basis of the power flowing through the conductive element 10 in the vicinity of which it is placed.

Specifically, the energy drawn from the conductive element 10 is collected by a windless energy-harvesting system 11, i.e. one without a conductive wire winding, included in the cable.

The energy-harvesting system 11 extends for example helically around the conductive element 10.

The energy-harvesting system 11 may for example be of the type described below with reference to FIG. 2.

Figure 2:
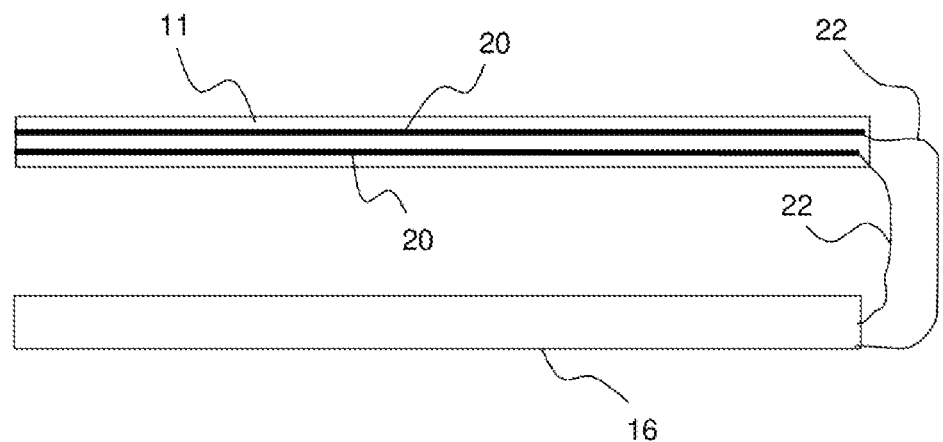
FIG. 2 is a schematic representation of a segment of a strip and of a windless energy-harvesting system comprised in the cable of FIG. 1.

As shown in FIG. 2, this energy-harvesting system 11 comprises two ferromagnetic rope-stranded conductors 20 composed of groups of wires of ferromagnetic material of small diameter, typically from a few hundredths of a millimeter to a few millimeters, for example from 0.1 mm to 0.4 mm, and typically 0.2 mm. These groups are themselves stranded together to form each rope-stranded conductor 20, which is connected to the strip 16 via connections 22. The ferromagnetic material is for example iron or an alloy of iron and nickel, such as for example FeNi50 or FeNi80, these examples being in no way limiting, any type of ferromagnetic material being able to be used. When the ferromagnetic material used has a relatively high permeability, typically of a few thousand as is the case for an FeNi80 alloy, it is possible to produce a maximum voltage level with the lowest current possible in the conductive element 10, typically a few amps.

The rope-stranded conductors 20 act as a ferromagnetic core positioned around the conductive element 10. The current that flows through the conductive element 10 induces a magnetic flux in all of the groups that make up each rope-stranded conductor 20. Depending on the way in which the stranding is carried out, each group occupies a certain fraction of the total cross-sectional area and acts as a winding in which a voltage is induced. The groups therefore form the equivalent of a set of windings connected in parallel, and a voltage is present between the two ends of each rope-stranded conductor 20.

Moreover, by virtue of this flexible magnetic core, the self-lighting cable retains a good flexibility, due to the small diameter of the wires of ferromagnetic material forming the groups from which each rope-stranded conductor 20 is formed. The number of wires (or strands) is adjusted so as to obtain the cross-sectional area of ferromagnetic material required to obtain the desired voltage. These strands are stranded together, either in a single group for rope-stranded conductors 20 of small cross-sectional area, or in a number of intermediate groups. The strands and the intermediate groups in the same rope-stranded conductor 20 are advantageously "twisted" in the same direction (clockwise or counterclockwise) so that the induced voltages do not cancel each other out.

Unitary strands may be insulated from one another. They also may not be insulated from one another. In this second case, they always make contact with one another. The voltage gradient is advantageously zero over the entirety of the cross section of a rope-stranded conductor 20, whatever the position in the rope-stranded conductor 20, in order to avoid the creation of short circuits. There is no potential difference between the strands; no current can flow from one strand to another. To this end, all the unitary strands trace the same "path" in order to occupy the same equivalent crosssectional area along the entire length of the rope-stranded conductor 20. The stranding parameters of the various intermediate groups, such as the lay and the number of strands, are chosen so as to meet this condition.

It is advantageous to manufacture rope-stranded conductors 20 composed of the highest possible number of strands with the fewest possible groups. Combinations of 2, 3 or 4 strands without a central strand may be produced, in order to guarantee that the strands are all twisted identically.

The stranding of the rope-stranded conductor 20 may then be carried out in a number of steps: for example, first stranding of 2 or 3 strands, then stranding of 2 or 3 groups of 2 or 3 strands, then stranding of 2 or 3 groups of 2 or 3 groups of 2 or 3 strands, and so on until the desired number of strands and the desired ferromagnetic cross-sectional area are obtained.

One parameter that influences the induced voltage level is the stranding lay. In a rope-stranded conductor 20 made up of a plurality of groups, the lay of each intermediate group should be taken into account. Reducing the lay increases the number of turns per unit length and therefore the number of equivalent winding turns. This is an advantageous way of increasing the voltage level, but the lay length will however be chosen so as to maintain a good flexibility and to reduce deformations.

Moreover, the direction of winding on the conductive element 10 affects the phase of the output voltage. Specifically, if the stranding direction of the rope-stranded conductor 20 is the same as the winding direction on the conductive element 10, the voltage will be in phase with the current. In contrast, if the stranding direction is opposite to the winding direction on the conductive element 10, the voltage will be in phase opposition to the current. In addition, for a current of given value, the voltages induced at the ends of a rope-stranded conductor 20 will differ depending on whether the stranding direction is the same as or opposite to the winding direction on the conductive element 10.

The induced voltage available at the ends of a rope-stranded conductor 20 is proportional to the length of the rope-stranded conductor 20. To obtain a sufficient voltage, for example 3 V minimum, a plurality of meters of rope-stranded conductor may be necessary. The distance between the connections for harvesting this voltage may therefore also be a plurality of meters. In order for two connection terminals to be side by side, two rope-stranded conductors 20 stranded in opposite directions relative to each other are advantageously wound in parallel on the conductive element 10. Placing these two rope-stranded conductors 20 in series makes it possible to add the voltages induced in each rope-stranded conductor 20.

Optionally, a terminal crimped directly onto each rope-stranded conductor 20 may clamp the strands against one another and thus ensure the electrical contacts and the mechanical strength of the groups.

Due to optimization of iron losses, the self-lighting power cable exhibits low overheating.

The energy-harvesting system 11 supplies the strip 16 with electric current via electromagnetism, for example at regular intervals.

The strip 16 comprises a plurality of light-producing elements that produce light from the electric current. The emission of light has been represented by four arrows in FIG. 1.

These light-producing elements may be light-emitting diodes.

In one particular embodiment, the strip 16 could be equipped with batteries for storing electricity.

Moreover, the cable can be equipped with one or more sensors in addition to the light-emitting sensors provided on the strip 16, such as sensors measuring certain parameters reflecting the state of the cable, such as for example temperature, the magnitude of the current, voltage, power, mechanical tension or even GPS location (GPS being the acronym of Global Positioning System). The energy-harvesting system 11 may supply this (these) sensor(s) with electric current.

The energy-harvesting system 11 may also supply with electric current any other element, such as one or more transmitting systems, for example of Wi-Fi type.

A transparent protective sheath (not shown) may be placed around the conductive elements 10, 12 and 14, the strip 16 and the energy-harvesting system 11.

The transparent protective sheath is for example made of plastic.

The cross-sectional area of the self-lighting cable may be small.

During the manufacture of the cable, one step consists, after the energy-harvesting system 11 has been wound around the conductive element 10 of the cable, in extruding the transparent protective sheath onto the assembly formed by the conductive elements 10, 12 and 14, the strip(s) 16 and the energy-harvesting system 11.

The invention claimed is:

1. A power cable comprising:
a central stuffing region containing at least one conductive element, wherein said power cable further comprises at least one strip placed in said central stuffing region, in the vicinity of said at least one conductive element, said cable being equipped with a windless energy-harvesting system including at least one ferromagnetic rope stranded conductor disposed along said at least one conductive element which supplies said strip with electric current on the basis of the energy available in said at least one conductive element, said strip comprising a plurality of light-producing elements that produce light from said electric current collected by the at least one ferromagnetic rope stranded conductor.

2. The cable as claimed in claim 1, wherein said cable further comprises a transparent protective sheath placed around said at least one conductive element, said at least one strip and said energy-harvesting system.

3. The cable as claimed in claim 2, wherein said transparent protective sheath is extruded onto the assembly formed by said at least one conductive element, said at least one strip and said energy-harvesting system.

4. The cable as claimed in claim 2, wherein said transparent protective sheath is made of plastic.

5. The cable as claimed in claim 1, wherein said plurality of light-producing elements comprises at least one light-emitting diode.

6. The cable as claimed in claim 1, wherein said energy-harvesting system also supplies electric current to at least one sensor of at least one parameter relative to the state of the cable.

7. The cable as claimed in claim 1, wherein said energy-harvesting system extends helically around said at least one conductive element.

8. The cable as claimed in claim 7, wherein said at least one conductive element is a phase of said cable.

9. The cable as claimed in claim 1, wherein said cable is a mining cable.

10. A process for manufacturing a power cable as claimed in claim 2, wherein said process comprises a step consisting in extruding said protective sheath onto the assembly formed by said at least one conductive element, said at least one strip and said energy-harvesting system.

* * * * *